United States Patent
Arakawa et al.

(10) Patent No.: US 7,315,970 B2
(45) Date of Patent: Jan. 1, 2008

(54) SEMICONDUCTOR DEVICE TO IMPROVE DATA RETENTION CHARACTERISTICS OF DRAM

(75) Inventors: Tomofumi Arakawa, Tokyo (JP); Hiroaki Kodama, Chiba (JP); Kazutoshi Inoue, Tokyo (JP)

(73) Assignee: Sony Corporation (JP)

( * ) Notice: Subject to any disclaimer, the term of this patent is extended or adjusted under 35 U.S.C. 154(b) by 341 days.

(21) Appl. No.: 11/078,506

(22) Filed: Mar. 14, 2005

(65) Prior Publication Data

US 2005/0210186 A1    Sep. 22, 2005

(30) Foreign Application Priority Data

Mar. 19, 2004  (JP) ............................ 2004-081505
Jun. 11, 2004  (JP) ............................ 2004-173853

(51) Int. Cl.
G01R 31/28    (2006.01)
G06F 11/00    (2006.01)
G06F 12/00    (2006.01)
G06F 13/00    (2006.01)
G06F 13/28    (2006.01)
G11C 29/00    (2006.01)
H03M 13/00    (2006.01)

(52) U.S. Cl. ............... 714/718; 714/733; 714/763; 714/801; 711/106

(58) Field of Classification Search .............. None
See application file for complete search history.

(56) References Cited

U.S. PATENT DOCUMENTS 6,381,715 B1 * 4/2002 Bauman et al. ............. 714/718

2002/0018389 A1 * 2/2002 Ito et al. .................... 365/222
2002/0156967 A1 * 10/2002 Okuda ........................ 711/106
2003/0106010 A1 * 6/2003 Fujioka et al. ............. 714/763
2004/0017703 A1 * 1/2004 Shinohara ................... 365/200

FOREIGN PATENT DOCUMENTS

JP    2002-056671    2/2002

OTHER PUBLICATIONS

Yamauchi et al "A Curcuit Technology for a Self- Refresh 16Mb DRAM with Less than 0.5uA/MB Data-Retention Current", Nov. 1995, IEEE Journal of Solid-State Circuits, vol. 30, No. 11.*

* cited by examiner

Primary Examiner—Brian R. Peugh
Assistant Examiner—Fred W Detschel
(74) Attorney, Agent, or Firm—Rader Fishman & Grauer PLLC; Ronald P. Kananen

(57) ABSTRACT

A semiconductor device able to improve data retaining characteristics and decrease power consumption, further able to realize more unrestricted system without increasing excessive circuits, and having the following: an ALPG receiving a start signal and a mode selection signal to generate commands and addresses with respect to a DRAM circuit with the predetermined patterns in accordance with modes, and outputting an ending signal when ending a pattern generating processing in each of modes; an ECC circuit receiving a start signal and a mode selection signal indicating a parity generation mode to generate a parity based on data read from the DRAM circuit, receiving the start signal and a mode selection signal indicating an error correction mode to perform an error correction with respect to data read from the DRAM circuit based on the parity generated in the parity generation mode and outputting data after correcting; and an interface circuit.

15 Claims, 13 Drawing Sheets

|  | START POSITION | END POSITION |
|---|---|---|
| BANK 0 | [ 31 : 0 ] | [ 95 : 54 ] |
| BANK 1 | [ 127 : 96 ] | [ 63 : 32 ] |
| BANK 2 | [ 95 : 64 ] | [ 31 : 0 ] |
| BANK 3 | [ 63 : 32 ] | [ 127 : 96 ] |

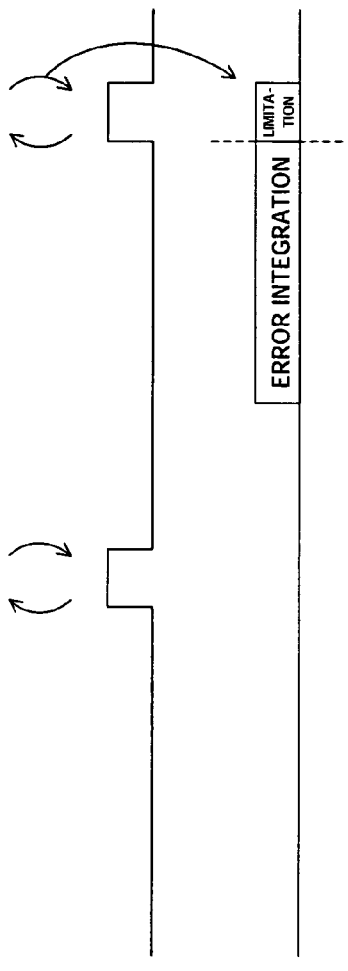
FIG. 11A  EMSEL MODE SELECTION  PARITY GENERATION MODE  ERROR CORRECTION MODE
FIG. 11B  RUN
FIG. 11C  END
FIG. 11D  ECCSTS — ERROR INTEGRATION / LIMITATION
FIG. 11E  STBY STANDBY SIGNAL
FIG. 11F  SCLK STANDBY CLOCK — STADDBY MODE / STANDBY REFRESH

SEMICONDUCTOR DEVICE TO IMPROVE DATA RETENTION CHARACTERISTICS OF DRAM

CROSS REFERENCES TO RERATED APPLICATIONS

The present invention contains subject matter related to Japanese Patent Application JP 2004-081505 filed in the Japanese Patent Office on Mar. 19, 2004 and Japanese Patent Application JP 2004-173853 filed in the Japanese Patent Office on Jun. 11, 2004, the entire contents of which are incorporated herein by reference.

BACKGROUND OF THE INVENTION

1. Field of the Invention

The present invention relates to a semiconductor device embedding a dynamic random access memory (DRAM), in particular, a system circuit for improving data retaining characteristics of the DRAM.

2. Description of the Related Art

In general, data retaining characteristics of DRAMs has been decided, for example, by the poorest one of the memory cells to be mounted.

The characteristics of DRAMs have been decided by a leakage current characteristic caused by a crystal defect in the memory cell and observed as a random defect of a single bit at a memory cell matrix.

Moreover, a defective cell caused by these factors cannot be prevented even if an improvement of the producing processing is performed.

Therefore, in a general DRAM, the yield has been secured by replacing a cell having a poor data retaining characteristic with a redundancy cell.

However, the method has to add the redundancy cell in accordance with the number of defect to be secured, and the increase of area due to that becomes a disadvantage.

Further, since the number of the redundancy cells to be mountable is restricted, a substantial improvement of the retention cycle is difficult.

Due to this, in recent year, it has been restricted to a step in which the power consumption of a mobile application use DRAM in a standby mode is decreased by extending the refresh cycle drastically in the standby mode.

In recent years, as a data-retention controlling circuit for DRAM, a semiconductor integrated circuit device having an ECC circuit and a refresh period setting circuit had been proposed (refer to, for example, Japanese Patent Unexamined Publication (Kokai) No. 2002-56671).

The ECC circuit of the semiconductor integrated circuit device is performed with the following first and second operations: the first operation is that the ECC circuit is started when entering in a data retention mode of the memory circuit, a plurality of data retained in the memory circuit are read, and check bits for an error detecting and correcting are generated and recorded; and a second operation is that the circuit is started when returning from the data retention mode to a normal operation wherein a read or write operation is performed between the other circuits, reading a plurality of data and the check bit retained in the memory circuit is read, an error bit of data is corrected, and writing the data is written into a corresponding memory cell.

The refresh-period setting circuit sets a period used with the check bit in the ECC circuit and extended within the tolerance of an error generation, and it is made to perform a refresh operation.

The semiconductor integrated circuit system disclosed in Japanese Patent Unexamined Publication (Kokai) No. 2002-56671 can improve the data retaining characteristics of a DRAM and decrease power consumption, but it must be a prepared exclusive pattern generating circuit. When designing a circuit able to generate efficient patterns, the circuit size becomes large, and when making the circuit size small, a pattern becomes redundant and an operating time increases, so that it is caught in a dilemma. Then, as usual, only the minimum necessary circuits are mounted, but the pattern becomes redundant as mentioned above, and the operation time becomes a disadvantage.

Due to the above mentioned factors, the semiconductor integrated circuit system in the above document has the following disadvantages: (1) to mount the exclusive circuit causes an increase in excessive circuits; and (2) keeping the circuit size small, causes an increase in operating time.

SUMMARY OF THE INVENTION

The present invention is to provide a semiconductor device able to improve data retaining characteristics, decrease power consumption, and further able to realize a more unrestricted system without increasing excessive circuits.

According to a first aspect of the present invention, there is provided a semiconductor device having a memory circuit including a dynamic memory cell and performing refresh operations for retaining data of the memory circuit in a standby mode, comprising the following: a system block for outputting a start signal and a mode selection signal indicating a parity generation mode before being in the standby mode, receiving an end signal after the predetermined time to be in the standby mode and perform a refresh operation with respect to the memory circuit, then outputting the start signal and a mode selection signal indicating an error correction mode, and receiving the end signal after the predetermined time to be in a normal mode; a pattern generating circuit for receiving the start signal and the mode selection signal indicating the parity generation mode or the start signal and the mode selection signal indicating the error correction mode to generate commands and addresses with respect to the memory circuit with the predetermined pattern corresponding to a mode, and outputting the end signal when a patter generating operation finishes in the respective modes; an error correcting circuit for receiving the start signal and the mode selection signal indicating the parity generation mode to generate a parity based on data read from the memory circuit, receiving the start signal and the mode selection signal indicating the error correction mode to perform an error correcting operation based on the parity generated with respect to data read from the memory circuit in the parity generation mode, and outputting data after error correcting; and an interface circuit for inputting the start signal and the mode selection signal indicating the parity generation mode or the start signal and the mode selection signal indicating the error correction mode by the system block to the pattern generation circuit and the error correction circuit, supplying commands and addresses by the pattern generating circuit to the memory circuit, inputting data read from the memory circuit to the error correcting circuit, and outputting data after error correction mode processing by the error correction circuit to the memory circuit.

Preferably, the memory circuit, the system block, the pattern generating circuit, the error correcting circuit and the interface circuit are integrated in a single chip.

Preferably, the pattern generating circuit is formed by a BIST (Built-In Self Test) circuit.

Preferably, the pattern generating circuit has a program retention memory inside and receives the start signal to generate a pattern provided according to a program of the program retention memory.

Preferably, the memory circuit allocates a real data area and a parity area to different areas in a recording area.

Preferably, the memory circuit is divided into a plurality of blocks, and the parity data is memorized in a block different from an area where a corresponding real data is recoded.

According to the present invention, for example, first, for performing a parity generation in the parity generation mode, the system block outputs the mode selection signal and the start signal passing though the interface circuit to the pattern generating circuit and the error correcting circuit.

The pattern generating circuit that received the mode selection signal and the start signal reads data from the memory circuit and inputs the same to the error correcting circuit to generate the parity, generates a read command and address with the predetermined pattern and outputs the same to the interface circuit.

The command and address are supplied selectivity by the interface circuit to the memory circuit.

Due to this, the real data and the parity data are read from the memory circuit. The data of the memory circuit are input selectivity by the interface circuit to the error correcting circuit.

The error correcting circuit receives the start signal and the selection signal indicating the parity generation mode via the interface circuit by the system block. In the parity generation mode of the ECC operation mode in the standby state, the parity bit is generated based on data that is read from the memory circuit and input passing though the interface circuit. The parity data are stored for using in the error correcting processing in every standby mode of the error correction mode.

Then, when the predetermined time elapses to end the parity generation mode, the pattern generating circuit outputs an end signal via the interface circuit to the system block.

The system block that received the end signal is in the standby mode that is the state able to retain data for a long time.

The system block performs a standby refresh for data retention with respect to the memory circuit.

Next, in order to perform the error correction in the error correction mode, the system block outputs the mode selection signal and the start signal passing though the interface circuit to the pattern generating circuit and the error correcting circuit.

The pattern generating circuit, in periods introducing to the standby mode and resetting from the standby mode, receives the start signal and the mode selection signal indicating the error correction mode via the interface circuit by the system block. The data read from the memory circuit are made to input to the error correcting circuit and perform the error correction of the defective (error) bit. Then, the real data after correcting or free from correcting and the parity bit data are read from the error correcting circuit, and a reading command and address are generated with the predetermined pattern and output to the interface circuit for writing with respect to the memory circuit.

The command and address are supplied selectivity by the interface circuit to the memory circuit.

Due to this, the real data and the parity data are read from the memory circuit. Then, data of the memory circuit are input selectivity by the interface circuit to the error correcting circuit.

The error correcting circuit receives the start signal and the selection signal indicating the error correction mode via the interface circuit by the system block. In the error correction mode of the ECC operation mode in the standby state, the data read from the memory circuit are input passing though the interface circuit, and the error correction is performed with respect to defective data based on the parity generated in the parity generation mode.

The error correcting circuit outputs data after error correcting or error correcting is found unnecessary and the parity bit data to the interface circuit. Due to this, the data corrected with error correcting are written back into the memory circuit.

Then, when the predetermined operation finishes and the error correction mode ends, the pattern generating circuit outputs the end signal via the interface circuit to the system block.

The above processing is performed with respect to the entire data.

The system block that received the end signal is in a normal mode that is a normal data retention mode.

BRIEF DESCRIPTION OF THE DRAWINGS

These and other objects and features of the present invention will be described in more detail with reference to the accompanying drawings, in which:

FIG. 11, consisting of FIGS. 11A, 11B, 11C, 11D, 11E, and 11F, is a view for explaining a controlling operation in an ECC operation mode of a system block according to the present embodiment;

DESCRIPTION OF THE PREFERRED EMBODIMENTS

Next, preferred embodiments of the present invention will be explained with reference to the drawings.

Figure 1:
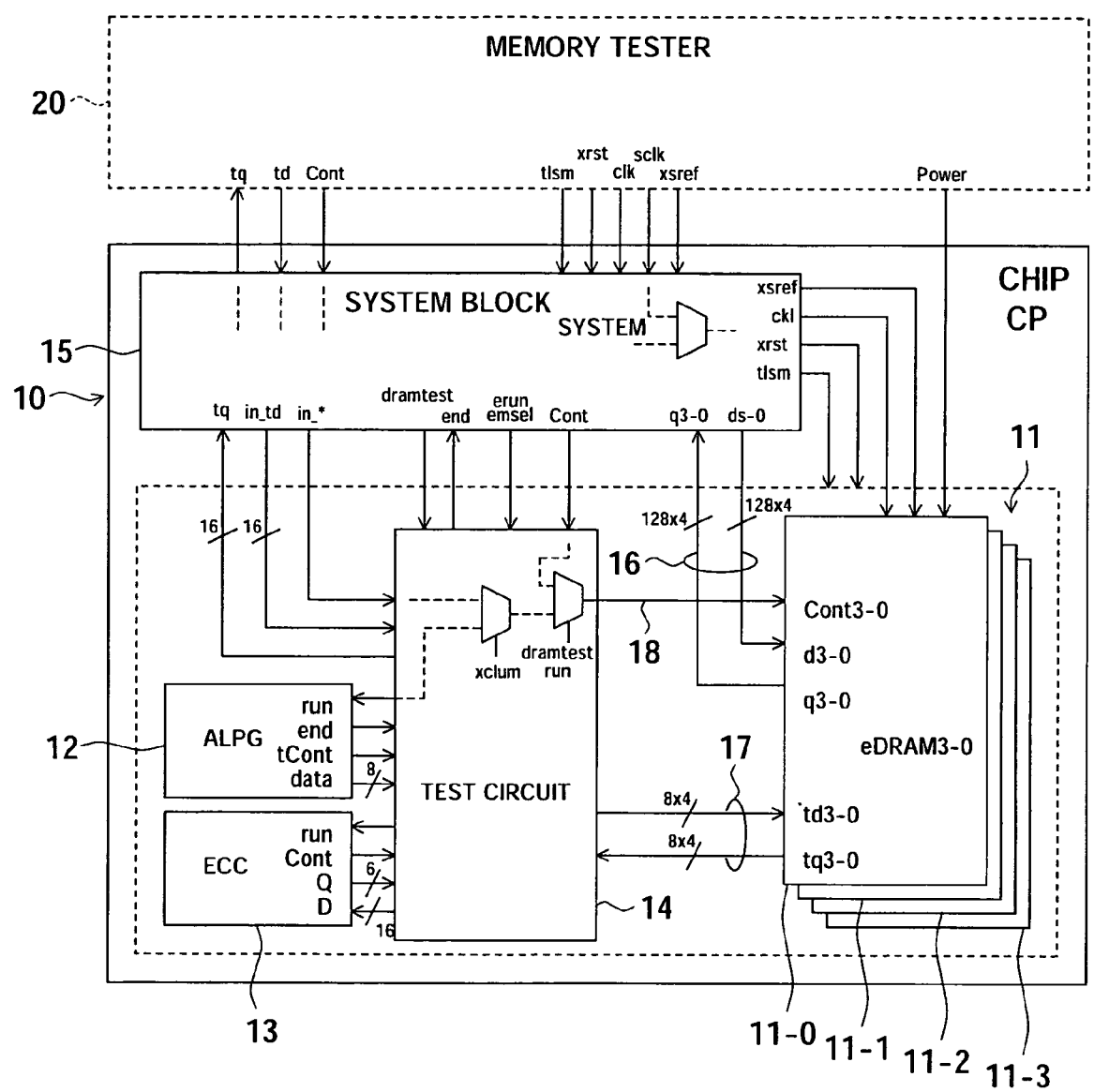
FIG. 1 is a system configuration view showing a semiconductor device of an embodiment.

FIG. 1 is a system configuration view showing an embodiment of a semiconductor device of an embodiment.

A semiconductor device 10 according to the present embodiment has a DRAM circuit 11, an algorithmic pattern generator (ALPG) 12 as a DRAM pattern generating circuit, an ECC circuit 13 as an error correcting circuit, a test circuit 14 as an interface circuit, and a system block 15, and the semiconductor device is formed by integrating them on a single chip CP.

The semiconductor device 10 according to the present embodiment connects a memory tester 20 outside of the chip CP to the system block 15 and can perform the predetermined test with respect to the DRAM circuit (eDRAM 0 to 3) 11.

The semiconductor device 10 generates a parity bit when introducing a standby state and corrects DRAM data by the ECC circuit (an ECC decoder) when returning from the standby state, so that it can improve a data retaining characteristic in the standby state of the DRAM.

The semiconductor device 10 realizes a system wherein the entire system generates only a start signal so as to be able to finish a series of operations for the generation of the parity data and data correction to control the DRAM pattern generating circuit embedded inside the system.

By making the pattern generating circuit as a built-in self test (BIST) circuit of DRAM (in the present embodiment, the ALPG 12), the excessive circuit mounted in the system can be decreased and the system can be optimized.

By using the BIST circuit, since a restriction with respect to an access to the DRAM is removed, it is possible to transfer data efficiently.

Hereinafter, the respective constructions and functions will be described.

The DRAM circuit 11 has, for example, a capacity of 64M bits, and it is divided into four banks 11-0 to 11-3 (eDRAM 0 to 3) each having the capacity of 16M bits.

The DRAM circuit 11 is not built into the refresh period setting circuit in the standby state, so the setting of the refresh period is performed by the system block 15. The DRAM circuit 11 is supplied with a clock by the system block 15. When using the memory tester 20, a clock by the memory tester 20 is supplied passing through the system block 15.

The DRAM circuit 11 performs a transfer of data (read and write) by a 128-bit unit in a single bank (11-0 to 11-3) with the system block 15 via a bus 16.

The DRAM circuit 11 performs a transfer of the data and parity by a 8-bit unit in a single bank with the test circuit 14 via a bus 17.

Further, the DRAM circuit 11 performs the transfer of commands by the system block 15 or commands by the ALPG 12 with the test circuit 14 via a bus 18.

The DRAM circuit 11 stores the real data and the parity bit data in the respective banks 11-0 to 11-3.

Figure 2:
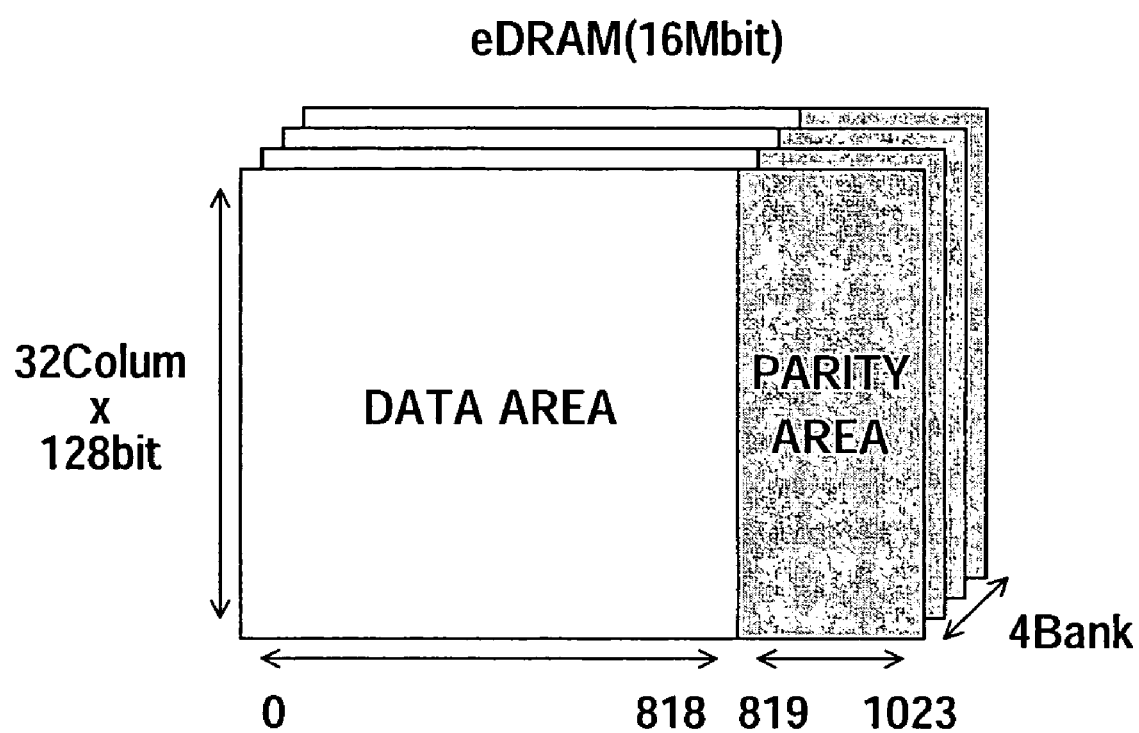
FIG. 2 is a view showing an allocating example of a data area and a parity area of DRAM according to the present embodiment.

In the present embodiment, a data area and a parity area are arranged in the respective banks 11-0 to 11-3 as shown in FIG. 2.

In an example of FIG. 2, a single bank has a memory area of 1024 rows and 32 columns×128-bits, and it is allocated with the data area of 819 rows of 0 to 818 and the parity area of 205 rows of 819 to 1023.

Figure 3:
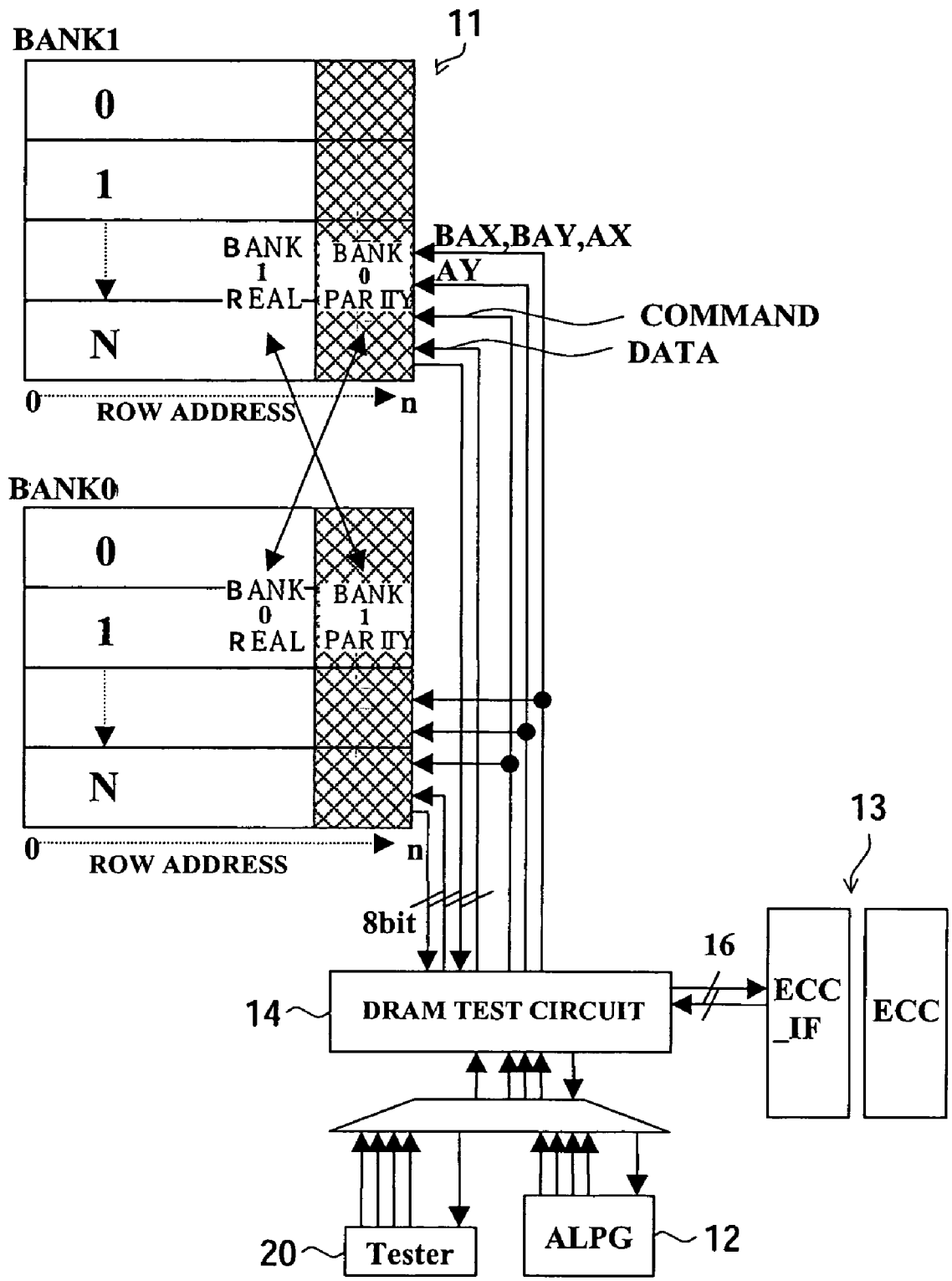
FIG. 3 is a view for explaining a method making two macros as a set for memorizing a real data and a parity data.

In the present embodiment, as shown in FIG. 3, the banks 11-0 and 11-1 and the banks 11-2 and 11-3 make the respective groups, and for example, the parity area with respect to the real data of the bank 11-0 is arranged at the bank 11-1, and the parity area with respect to the real data of the bank 11-1 is arranged at the bank 11-0.

Due to this, the parity bit is retained by using a part of the memory area and secured with the parity area by swapping data when introducing standby state.

Figure 4:
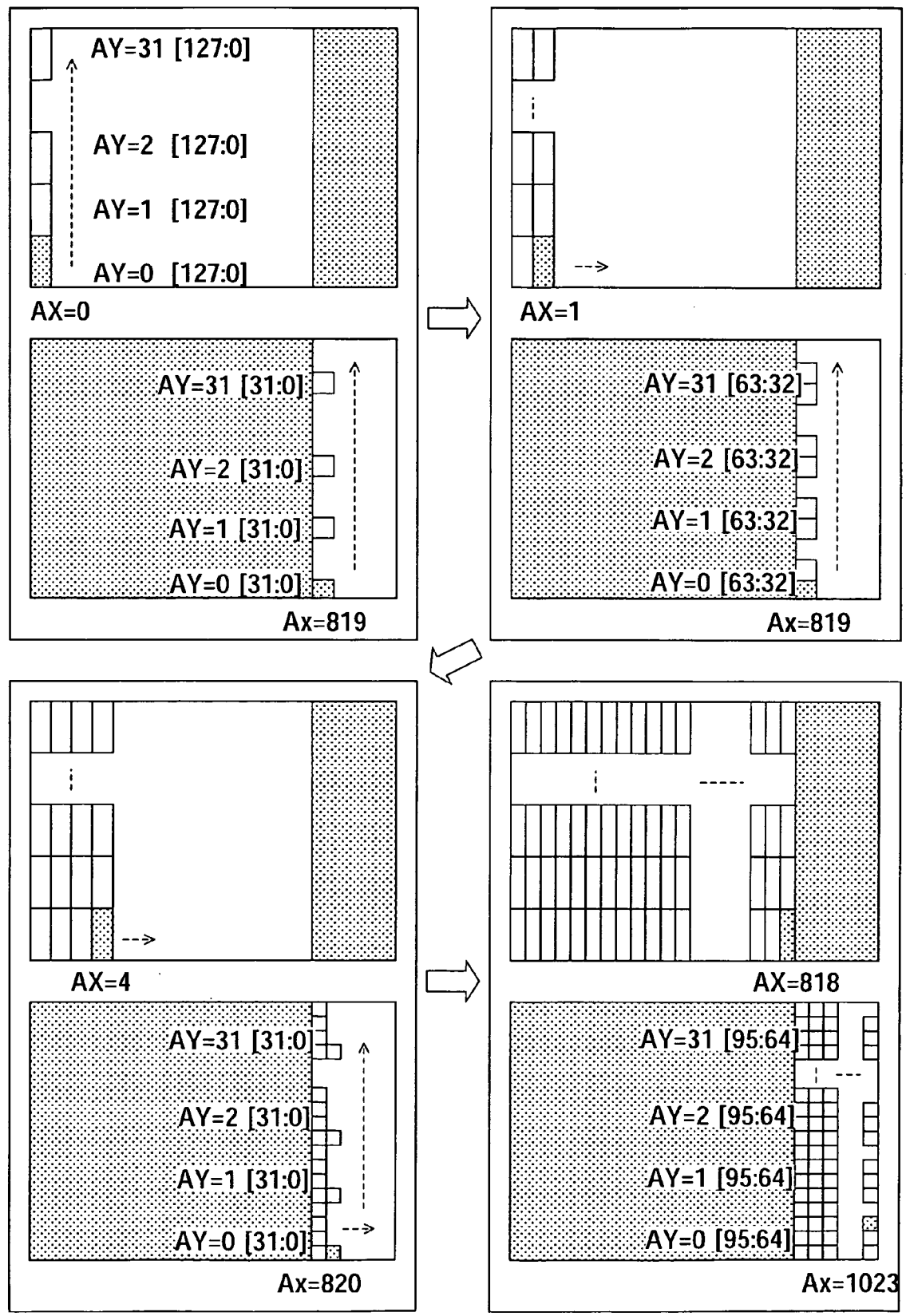
FIG. 4 is a view showing a corresponding relationship of a data address and a parity address in a bank 11-0 according to the present embodiment.

FIG. 4 shows a corresponding relationship between the data and the parity address of the bank 11-0 (BANK 0). In the bank 11-0, a start position is [31:0] and an end position is [95:64].

Figures 5, 6:
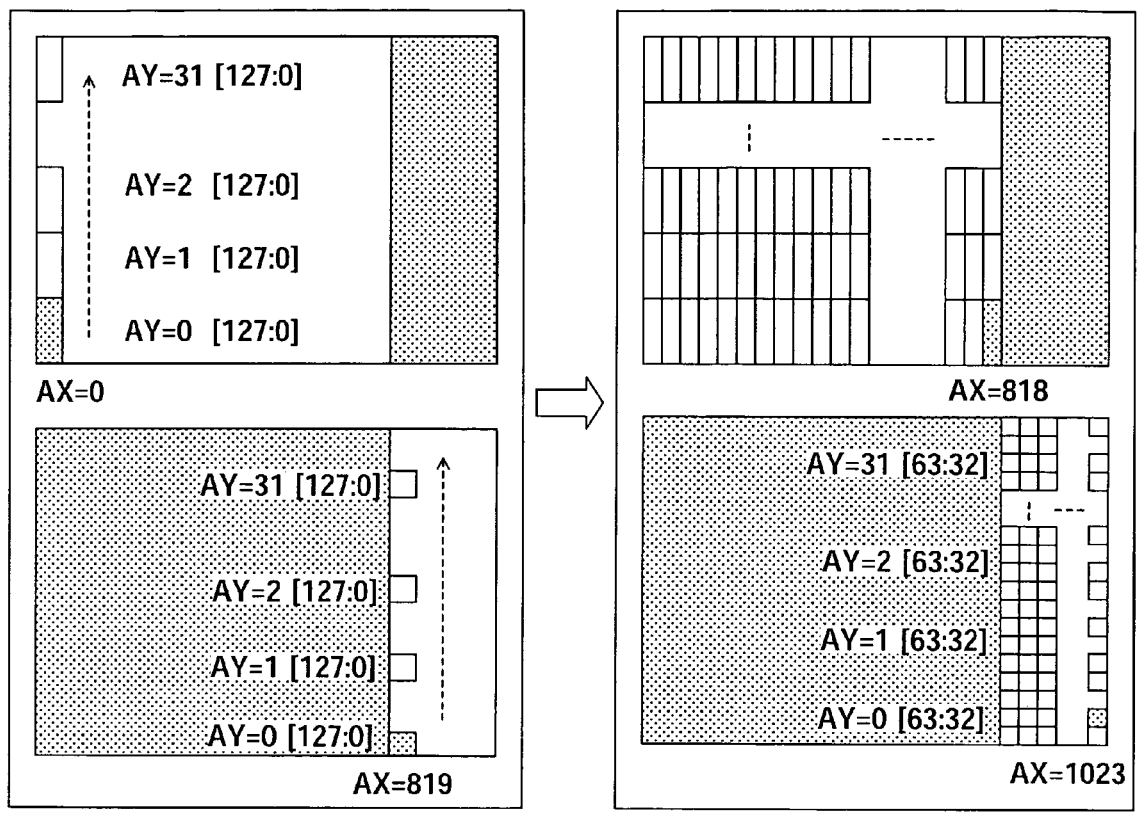
FIG. 5 is a view showing a corresponding relationship of a data address and a parity address in a bank 11-1 according to the present embodiment.
FIG. 6 is a view showing a start position and an end position of addresses in the banks 11-1 to 11-3 according to the present embodiment.

FIG. 5 shows a corresponding relationship between the data and the parity address of the bank 11-1 (BANK 1). In the bank 11-1, the start position is [127:96] and the end position is [63:32].

Similarly, as shown in FIG. 6, in the bank 11-2 (BANK 2), the start position is [95:64] and the end position is [31:0]. In the bank 11-3 (BANK 3), the start position is [63:32] and the end position is [127:96].

By applying the DRAM circuit 11 having the above configuration, the following effects can be obtained.

In the case of DRAM, when reading data, the corresponding data area has to be activated (activate operation).

Figure 7A:
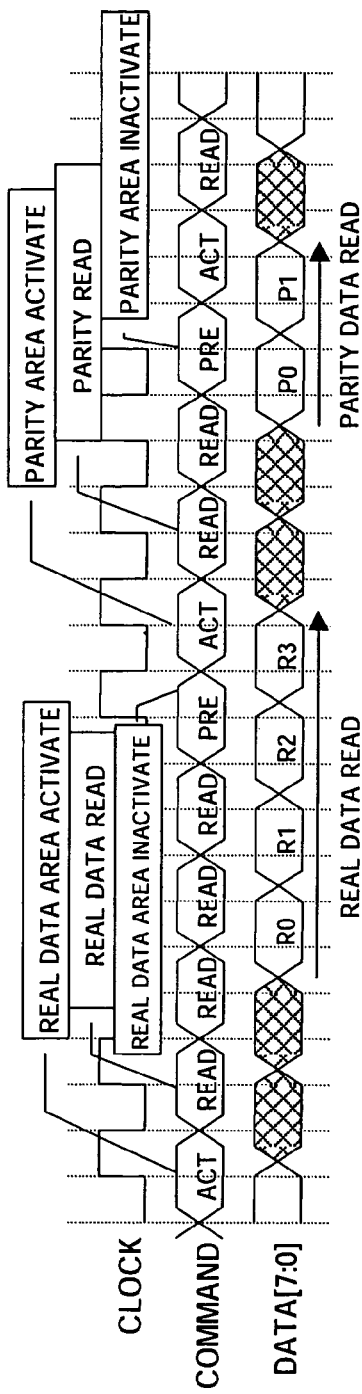
FIG. 7, consisting of FIG. 7A and FIG. 7B, is a view for explaining an effect by applied with a DRAM circuit according to the present embodiment.

For this reason, as usual, as shown in FIG. 7A, after finishing a read operation of the real data, the area has been performed with an inactivation (pre-charge operation), then the parity area has been activated and a read data has been stalled to restart the read operation.

Figure 7B:
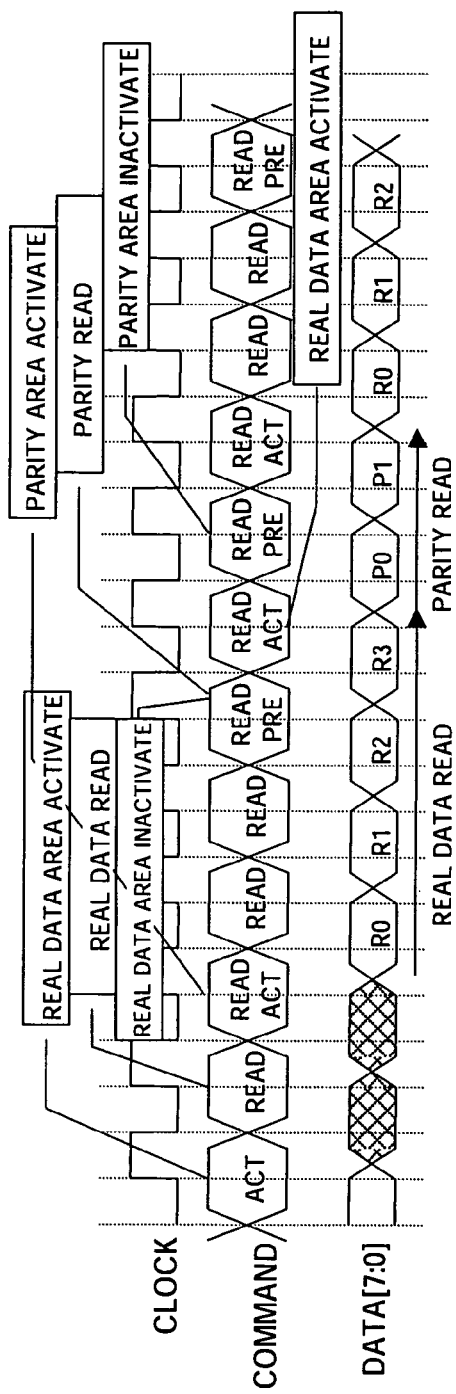

On the other hand, in the DRAM circuit 11 according to the present embodiment, as shown in FIG. 7B, the real data area and the parity data area are separated among the macros or banks and stored the same in the macros or banks, so that the read operation of the real data and the read operation of the parity can be performed continuously and an efficient data transfer becomes possible.

The ALPG 12 as the DRAM pattern generating circuit receives a start signal RUN and a selection signal EMS indicating the parity generation mode via the test circuit 14 by the system block 15, and reads out data from each of the banks 11-0 to 11-3 of the DRAM circuit 11 in the parity generation mode of the ECC operation mode in the standby state. Then it generates commands and addresses with the predetermined pattern and outputs the same to the test circuit 14 to make it input to the ECC circuit 13 and generate the parity. Then, when the predetermined time elapses to end the parity generation mode, it outputs the end signal END via the test circuit 14 to the system block 15.

The ALPG 12 receives the start signal RUN and the selection signal EMSEL indicating the error correction mode via the test circuit 14 by the system block 15 after the standby mode and the refresh period elapse, reads out data from each of the banks 11-0 to 11-3 of the DRAM circuit 11 and makes them input and the ECC circuit 13 perform the error correction in the error correction mode of the ECC operation mode in the standby state. Then it generates commands and addresses for writing with respect to each of the banks 11-0 to 11-3 of the DRAM circuit 11 with the real data and the parity data output by the ECC circuit 13 with the predetermined pattern, and outputs the same to the test circuit 14. Then, when the predetermined time elapses to end the error correction mode, it outputs the end signal END via the test circuit 14 to the system block 15.

Due to this, a series of operations in which the parity bit is generated when introducing the standby state and the DRAM data is corrected in returning from the standby state by the ECC circuit (ECC decoder) 13 is controlled by the ALPG 12 in accordance with the start signal RUN from the system block 15.

The ALPG 12 is a pattern generating circuit for generating the command and data in the BIST system, so it has a permissibility generating a lot of patterns required for testing the DRAM free from restraint.

In particular, in the case of devices having an embedded DRAM or a lot of bits I/O, a test use bus interconnection able to lead to outside of the chip CP must be limited (in the present embodiment, it is 8-bit).

Consequently, by using the ALPG 12, an efficient command pattern can be generated without stalling DRAM (or data base).

Figure 8:
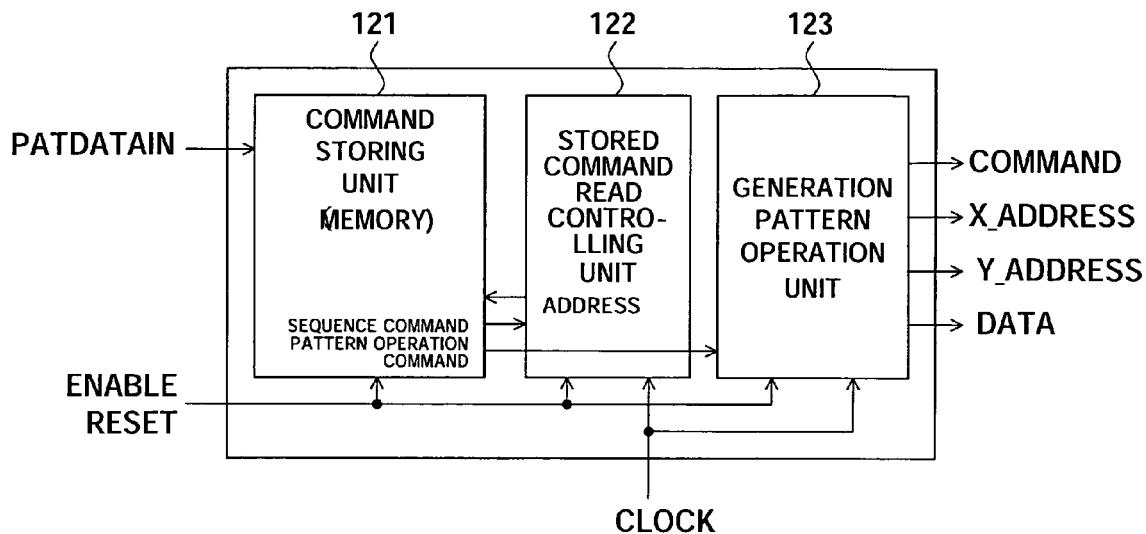
FIG. 8 is a block view showing an example of a concrete configuration of an ALPG as a DRAM pattern generating circuit according to the present embodiment.

FIG. 8 is a block view showing an example of a configuration of the ALPG 12 as the DRAM pattern generating circuit according to the present embodiment.

The ALPG 12 shown in FIG. 8 has a command storing unit 121, a stored command read controlling unit 122, and a generation pattern operation unit 123.

In the ALPG 12, data in the command storing unit 121 built into it are read by the stored command read controlling unit 122, and command patterns and address patterns are generated by the generation pattern operation unit 123 from the read command.

Due to this, by rewriting data of the command storing unit 121, it has also an advantage of being able to rewrite a command pattern easily.

The ECC circuit 13 receives the start signal RUN and the selection signal EMSEL indicating the parity generation mode via the test circuit 14 by the system block 15, and it generates parity bit data of 32-bit based on data read from each of banks 11-0 to 11-3 of the DRAM circuit 11 and input passing though the test circuit 14 in the parity generation mode of the ECC operation mode in the standby state.

The ECC circuit 13, after the standby mode and the refresh period elapse and before returning to the normal operation, receives the start signal RUN and the selection signal EMSEL indicating the error correction mode via the test circuit 14 by the system block 15, inputs data read from each of the banks 11-0 to 11-3 of the DRAM circuit 11 passing through the test circuit 14 in the error correction mode of the ECC operation mode in the standby mode, performs the error correction with respect to the defective data based on the parity generated in the parity generation mode, and outputs data after error correcting or error correcting is found unnecessary and the parity bit data to the test circuit 14.

The ECC circuit 13 transfers an error status data passing though the test circuit 14 to the system block 15.

The test circuit 14 supplies the start signal RUN and the selection signal EMSEL indicating the parity generation mode or the error correction mode by the system block 15 to the ALPG 12 and the ECC circuit 13, and functions as the interface circuit for data transferring based on the command and the address data generated by the ALPG 12 between each of the banks 11-0 to 11-3 of the DRAM circuit 11 and the ECC circuit 13.

The test circuit 14 supplies the error status information of the ECC circuit 13 to the system block 15.

Note that, in the error correction mode, only when there are correcting bits, data of 128-bits are written back to the banks 11-0 to 11-3 of the DRAM circuit 11.

If the correction is unnecessary, the write operation to the banks 11-0 to 11-3 is controlled so as not to perform.

The condition is referred to a signal for the number of the corrected bits of the ECC circuit 13, if the number of the corrected bit is not 0, the write-back operation is performed with respect to the banks 11-0 to 11-3.

Even if there are a lot of defects that are impossible to correct or the ECC circuit 13 performs a mistaken correction, referring to only the number of the corrected bit, the write operation is performed to the banks 11-0 to 11-3.

Figure 9:
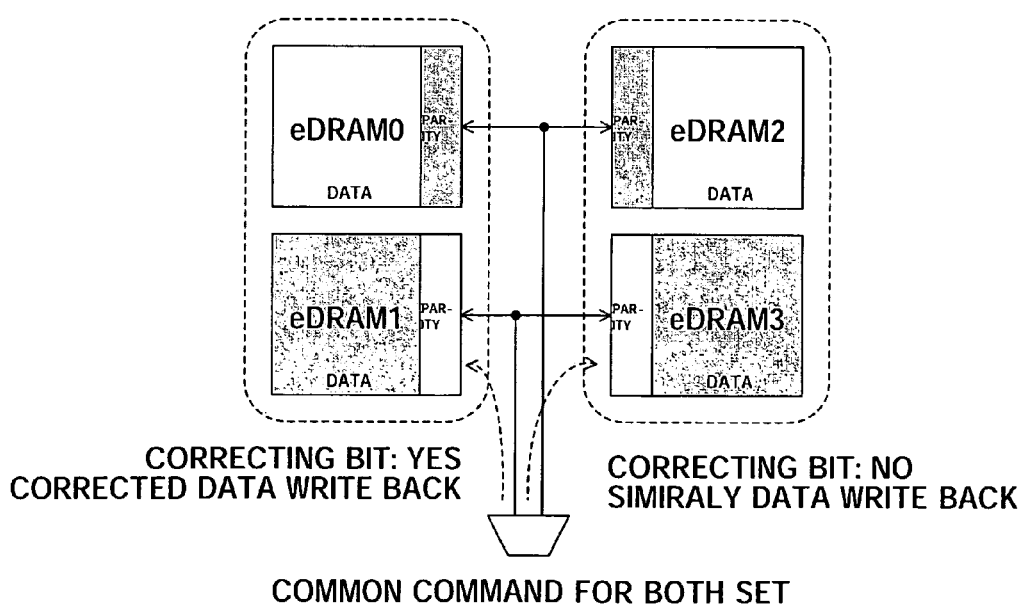
FIG. 9 is a view for explaining a write-back control of data when error correcting.

Further, the command signal is, as shown in FIG. 9, common to a first set (group) of the banks 11-0 and 11-1 and a second set (group) of the banks 11-2 and 11-3, and even if one set has the corrected bit and another does not have the corrected bit, the write operation is performed with respect to both sets.

The signal for the number of corrected bits is discriminated, for example, by the test circuit 14, and the control that is mentioned above is performed.

Figure 10:
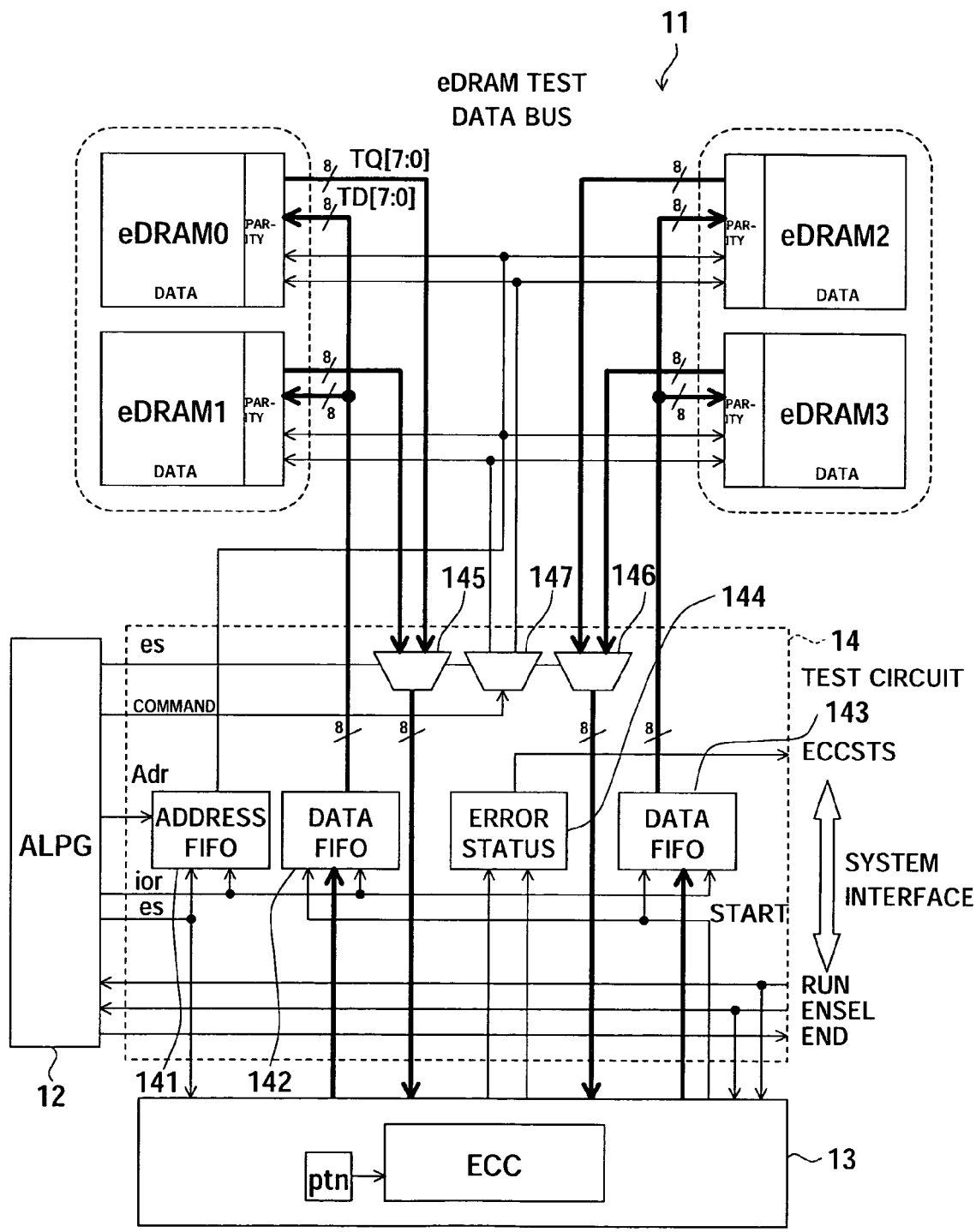
FIG. 10 is a function block view showing a concrete configuration of a test circuit according to the present embodiment.

FIG. 10 is a function block view showing a concrete configuration of the test circuit 14.

The test circuit 14 as shown in FIG. 10 has an address FIFO (First-In First-Out) 141, data FIFOs 142 and 143, an error status unit 144, and selectors 145 to 147.

The address FIFO 141 receives signals IOR and ES by the ALPG 12, retains the address data by the ALPG 12, and supplies the same to each of the banks 11-0 to 11-3 of the DRAM circuit 11.

The address FIFO 142 receives a signal 0_START by the ALPG 12, retains data by the ECC circuit 13, receives the signal IOR and supplies the retained data to the banks 11-0 and 11-1.

The address FIFO 143 receives the signal 0_START by the ALPG 12, retains data by the ECC circuit 13, receives the signal IOR and supplies the retained data to the banks 11-2 and 11-3.

The error states unit 144 receives error status information by the ECC circuit 13 and outputs the same as a signal ECCSTS to the system block 15.

The selector 145 selectively inputs read data of the bank 11-0 or bank 11-1 to the ECC circuit 13 based on the selection signal by the ALPG 12.

The selector 146 selectively inputs selectively read data of the bank 11-2 or bank 11-3 to the ECC circuit 13 based on the selection signal by the ALPG 12.

The selector 147 selectively supplies the command by the ALPG 12 to the banks 11-0 and 11-1 or the banks 11-2 and 11-3 based on the selection signal by the ALPG 12.

The system block 15 controls the entire system, in the ECC operation mode as shown in FIGS. 11A to 11F, and outputs the mode selection signal EMSEL and the start signal RUN passing though the test circuit 14 to the ALPG 12 and the ECC circuit 13.

The system block 15 first outputs the mode selection signal EMSEL and the start signal RUN passing though the test circuit 14 to the ALPG 12 and the ECC circuit 13 in order to perform a parity generation in the parity generation mode.

The system block 15, after ending the parity generation mode, performs a standby refresh for data retention with respect to the DRAM circuit 11 based on the standby signal STBY and the standby clock SCLK.

The system block 15, after ending the standby refresh, outputs the mode selection signal EMSEL and the start signal RUN passing though the test circuit 14 to the ALPG 12 and the ECC circuit 13 to make it perform an operation of the error correction mode for correcting defective (error) bits.

The system block 15 becomes the normal mode after ending the error correction mode, for example, and performs normal controls to memory access passing through the bus 16.

Next, an introducing or returning sequence to standby by the above configurations will be described with reference to the timing charts of FIG. 12 to FIG. 15.

Figure 12:
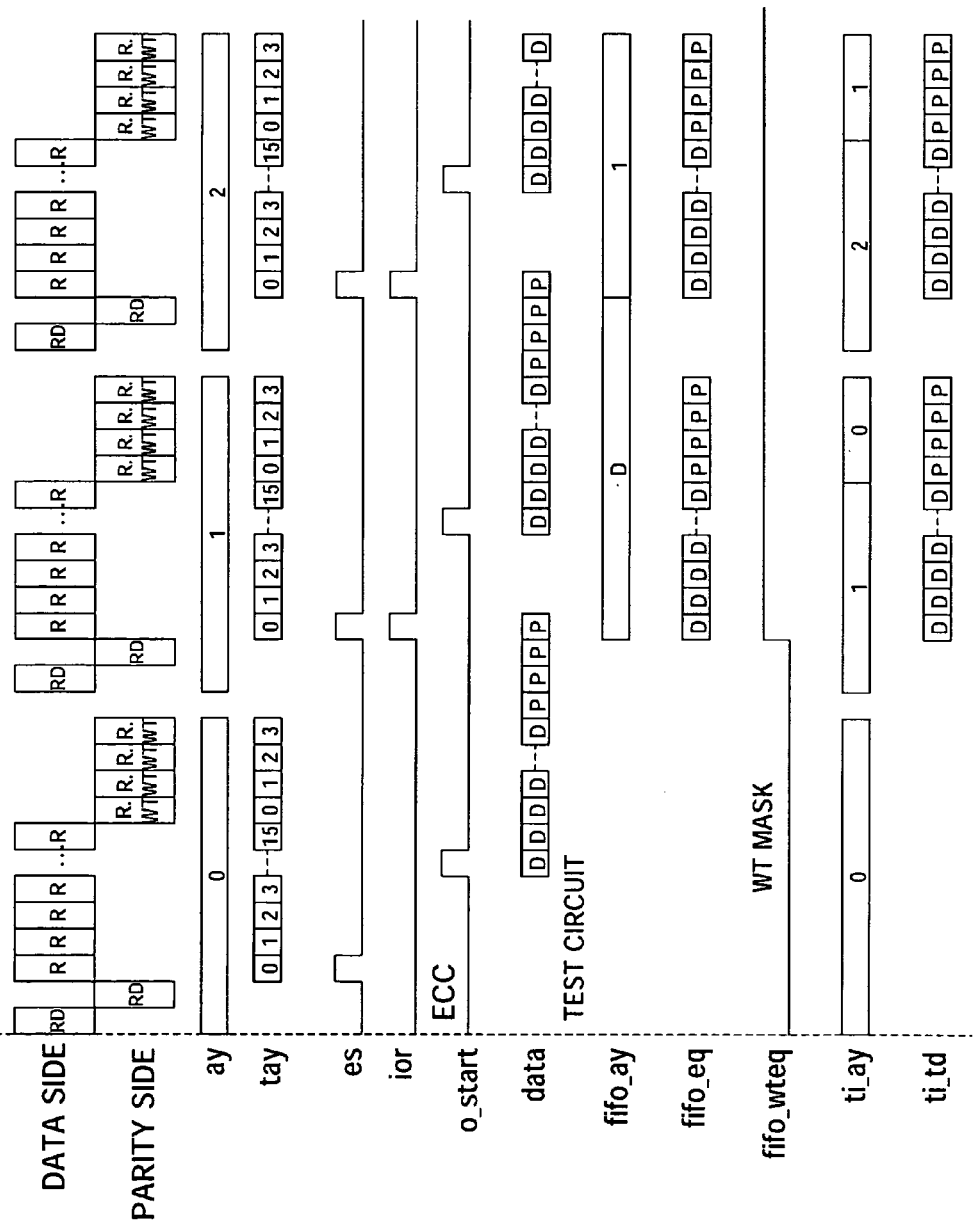
FIG. 12 is a timing chart in a parity generation mode when starting a parity generating page cycle.
Figure 13:
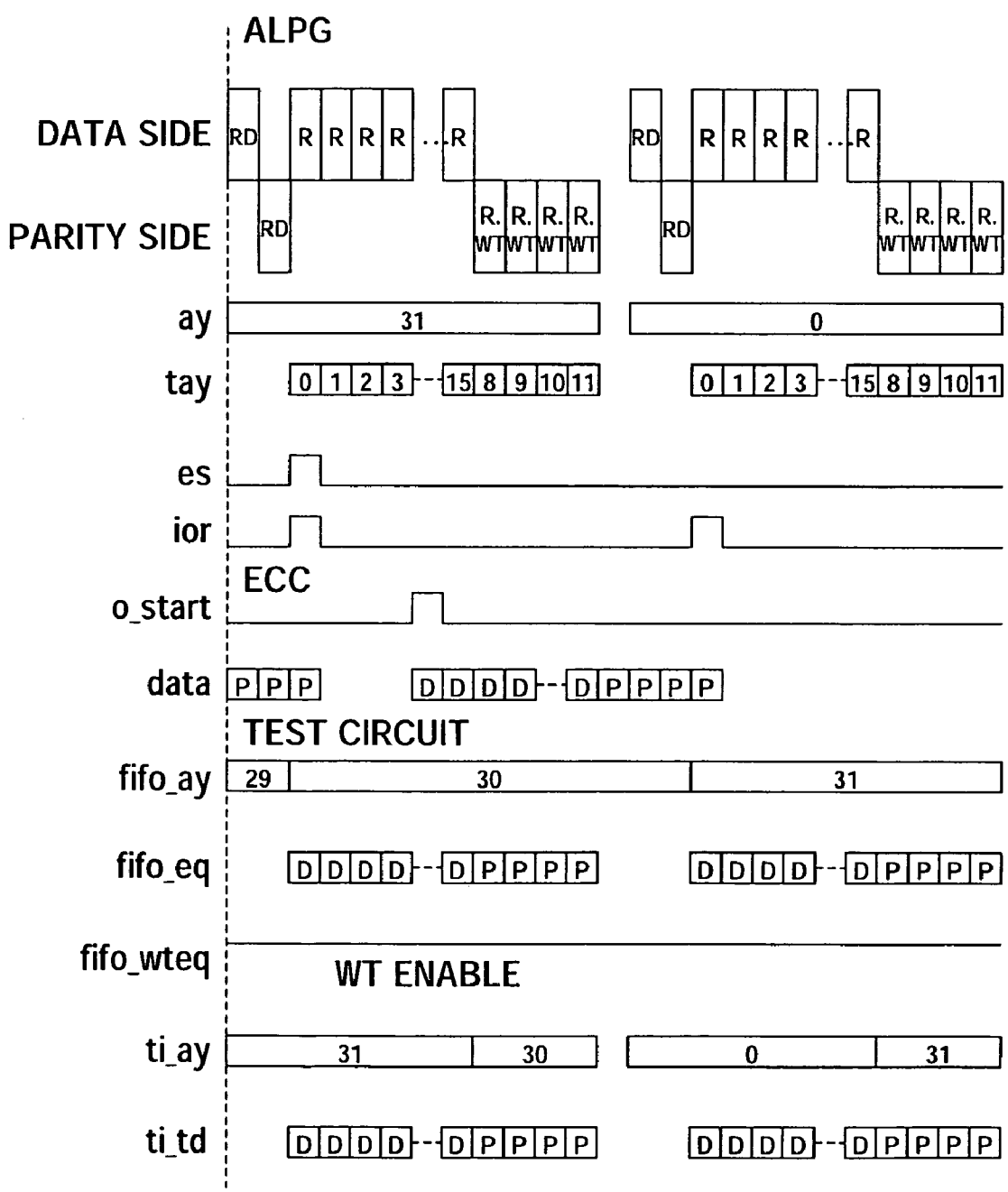
FIG. 13 is a timing chart in the parity generation mode when ending the parity generating page cycle.

FIG. 12 is a timing chart in the parity generation mode at the time of starting a parity generating page cycle. FIG. 13 is a timing chart in the parity generation mode at the time of ending the parity generating page cycle.

Figure 14:
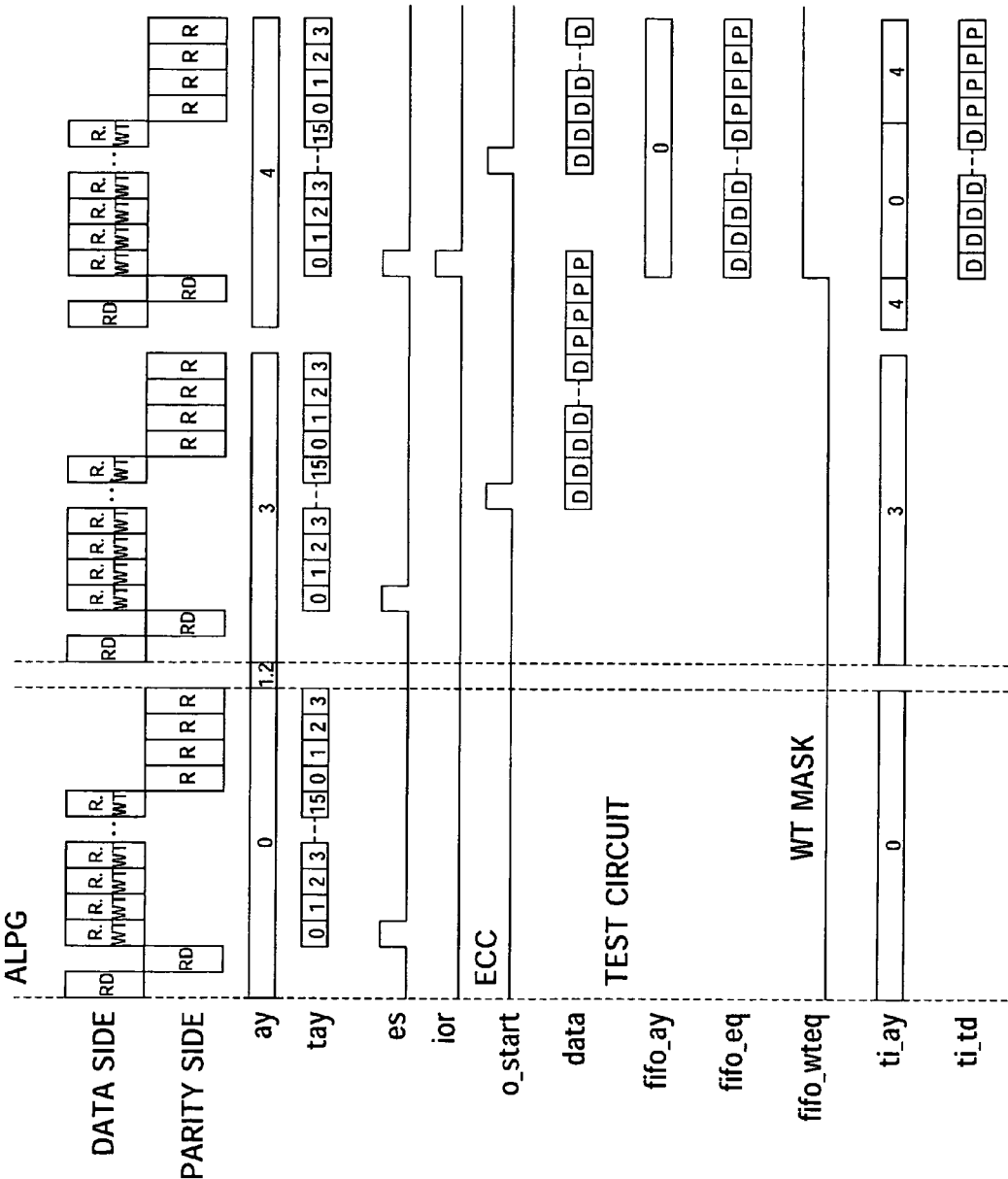
FIG. 14 is a timing chart in an error correction mode when staring an error correcting page cycle.
Figure 15:
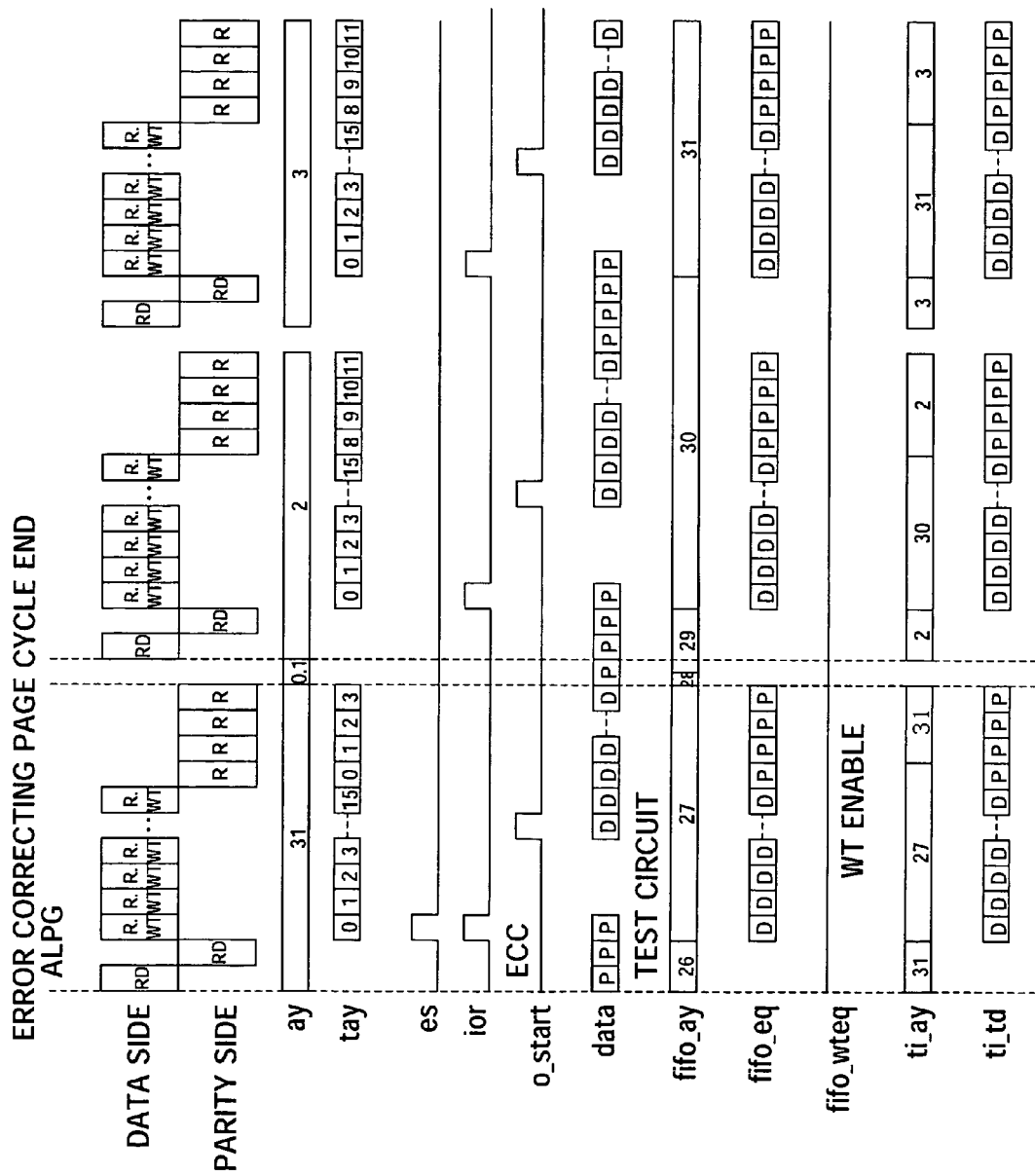
FIG. 15 is a timing chart in the error correction mode when ending the error correcting page cycle.

FIG. 14 is a timing chart in the error correction mode at the time of starting an error correcting page cycle. FIG. 15 is a timing chart in the error correction mode at the time of ending the error correcting page cycle.

Introducing to Standby

In order to perform the parity generation in the parity generation mode, the system block 15 outputs the mode selection signal EMSEL and the start signal RUN passing though the test circuit 14 to the ALPG 12 and the ECC circuit 13.

The ALPG 12 that received the mode selection signal EMSEL and the start signal RUN generates a read command RD and addresses AY and TAY as shown in FIGS. 12 and 13 with the predetermined pattern, and outputs them to the test circuit 14 in order to read data from the respective banks 11-0 to 11-3 of the DRAM circuit 11 and input to the ECC circuit 13 to make it generate parity.

The read command RD of a data side is a command for reading data of 128-bits, and the data among the banks 11-0 to 11-3, the test circuit 14 and the ECC circuit 13 are transferred by 8-bits, so that the command R is generated for dividing and transferring in 8-bits.

The generated parity bit data of 32-bits are divided into 8-bits similar to at the time of reading, and transferred to the bank. The macro is written and divided by using a writing function mask in every 8-bit for four times.

The commands and addressees are selectively supplied by the selector 147 of the test circuit 14 to the banks 11-0 to 11-3 of the DRAM circuit 11.

Due to this, the real data and the parity data are read from the banks 11-0 to 11-3 in 8-bit units. The data in the banks 11-0 and 11-1 are selectively input by the selector 145 of the test circuit 14 to the ECC circuit 13. Similarly, the data in the banks 11-2 and 11-3 are selectively input by the selector 146 of the test circuit 14 to the ECC circuit 13.

The ECC circuit 13 receives the start signal RUN and the selection signal EMSEL indicating the parity generation mode via the test circuit 14 by the system block 15. In the parity generation mode of the ECC operation mode in the standby state, a parity bit of 32-bit is generated based on data read from each of the banks 11-0 to 11-3 of the DRAM circuit 11 and input passing though the test circuit 14. The parity data are stored for use in the error correcting operation of the error correction mode in every standby mode.

Then, when the predetermined time elapses to end the parity generation mode, the ALPG 12 outputs the end signal END via the test circuit 14 to the system block 15.

The system block 15 that received the end signal END enters in the DRAM standby mode that is able to retain data for a long time.

The system block 15 performs the standby refresh with respect to the DRAM circuit 11 for data retention based on the standby signal STBY and the standby clock SCLK.

Returning from Standby

Next, in order to perform the error correction in the error correction mode, the system block 15 outputs the mode selection signal EMSEL and the start signal RUN passing though the test circuit 14 to the ALPG 12 and the ECC circuit 13.

After the standby mode and refresh period, the ALPG 12 receives the start signal RUN and the mode selection signal EMSEL indicating the error correction mode via the test circuit 14 by the system block 15, reads data from each of the banks 11-0 to 11-3 of the DRAM circuit 11, and inputs the same to the ECC circuit 13 to make it perform error correction of the defective (error) bit. The real data after error correcting or error correcting is found unnecessary are read from the ECC circuit 13, and the read command RD, a write command W, and the addresses AY and TAY as shown in FIGS. 14 and 15 are generated with the predetermined pattern and output to the test circuit 14 to make it write with respect to each of the banks 11-0 to 11-3 of the DRAM circuit 11.

The commands and addresses are selectively supplied by the selector 147 of the test circuit 14 to the banks 11-0 to 11-3 of the DRAM circuit 11.

The address of the time of the writing operation is supplied passing though the address FIFO 141 of the test circuit 14 to the respective banks 11-0 to 11-3.

Due to this, the real data and the parity data are read from the each of banks 11-0 to 11-3 by 8-bit units. The data of the banks 11-0 and 11-1 are selectively input by the selector 145 of the test circuit 14 to the ECC circuit 13. Similarly, the data of the banks 11-2 and 11-3 are selectively input by the selector 146 of the test circuit 14 to the ECC circuit 13.

The ECC circuit 13 receives the start signal RUN and the selection signal EMSEL indicating the error correction mode via the test circuit 14 by the system block 15. In the error correction mode of the ECC operation mode in the standby mode, the data read from each of the banks 11-0 to 11-3 of the DRAM circuit 11 are read passing though the test circuit 14 to perform the error correction with respect to the defective data based on the parity generated in the parity generation mode.

Then, the ECC circuit 13 outputs data after correcting or correcting is found unnecessary to and parity bit data to the test circuit 14. Due to this, data corrected errors are written back to the predetermined banks 11-0 to 11-3.

The ECC circuit 13 transfers an error status passing though the test circuit 14 to the system block 15.

Then, when the predetermined operation is finished to end the error correction mode, the ALPG 12 outputs the end signal END via the test circuit 14 to the system block 15.

The above processing is performed with respect to the entire data.

The system block 15 that received the end signal END is in the normal mode that is the normal data retention mode.

As mentioned above, according to the present embodiment, the semiconductor device 10 has the following units: the system block 15 for outputting the start signal and the mode selection signal indicating the parity generation mode before entering the standby mode, receiving the end signal after the predetermined time to perform a refresh operation with respect to the DRAM circuit 11 in the standby mode, then outputting the start signal and the mode selection signal indicating the error correction mode, and receiving the end signal after the predetermined time to enter in the normal mode; the ALPG 12 for receiving the start signal and the mode selection signal indicating the parity generation mode and the start signal and the mode selection signal indicating the error correction mode to generate the commands and addresses with respect to the DRAM circuit 11 with the predetermined pattern in accordance with the mode, and outputting the end signal when the parity generating operation is finished in the respective mode; the ECC circuit 13 for receiving the start signal and the mode selection signal indicating the parity generation mode to generate a parity based on data read from the DRAM circuit 11, receiving the start signal and the mode selection signal indicating the error correction mode to perform the error correcting processing with respect to data read from the DRAM circuit 11 based on the parity generated in the parity generation mode, and outputting data after error correcting; and the test circuit 14 for inputting the start signal and the mode selection signal indicating the parity generation mode, and the start signal and the mode selection signal indicating the error correction mode by system block 15 to the ALPG 12 and the ECC circuit 13, supplying the commands and addresses by the ALPG 12 to the DRAM circuit 11, inputting data read from the DRAM circuit 11 to the ECC circuit 13, and outputting data after the error correction mode processing by the ECC circuit 13 to the DRAM circuit 11. As a result, the embodiment can obtain following effects.

It is possible to improve the data retaining characteristics in the standby state of DRAMs.

By controlling a system by the ALPG 12 as a DRAM pattern generating circuit embedded inside, the system block 15 only generates the start signal, and a system able to complete a series of operations for the generation of the parity data and the data correction; can be realized subsequently, a load of the system block 15 controlling the entire system can be reduced.

Besides, since the ALPG 12 of the parity generating circuit is the DRAM BIST (Built In Self Test) circuit, the excessive circuit mounted in system can be reduced and the system can be optimized. By using the BIST circuit, the restriction with respect to accesses to DRAM is removed, and it is possible to transfer data efficiently.

Moreover, the ALPG 12 has, an internal program retention use memory, and by supplying only the start signal, it is possible to generate the provided patterns (command groups). When changing the provided pattern, it is possible to change easily only the changing memory contents.

Further, the refresh period setting circuit in the standby state can perform a refresh operation by the outer memory controller free from a built-in eDRAM system. Due to this, the refresh period in the standby state is changeable to a setting that is an amount optimized by considering the surroundings, such as chip temperatures.

The parity bit is retained by using a part of the memory area, so that the parity area can be secured by swapping data at the time of standby introduction. And the parity area is retained in the other banks or other blocks, so that efficient data transfer is possible at the time of transferring the real data or parity data.

Due to controlling by using the BIST circuit, by rewriting memory data, the embodiment has the advantage that the real data area and the parity data area can be set free from restrictions.

Due to controlling by using the BIST circuit, it is possible to improve a faultless detecting rate of the ECC system by quality testing during production.

As mentioned above, due to using the present invention, a DRAM refresh cycle in the standby state can be extended remarkably, and the effect decreasing power consumption due to this can be achieved parallel to the minimum necessary increase of the circuit size.

It should be understood by those skilled in the art that various modifications, combinations, sub-combinations and alterations may occur depending on design requirements and other factors so far in as they are within the scope of the appended claims or the equivalents thereof.

What is claimed is:

1. A semiconductor device having a memory circuit including a dynamic memory cell and performing a refresh operation for retaining data of said memory circuit in a standby mode, comprising:
    a system block for outputting a start signal and a mode selection signal indicating a parity generation mode before entering in the standby mode, entering in the standby mode when receiving an end signal after a first predetermined time and performing the refresh operation with respect to said memory circuit, then outputting a start signal and a mode selection signal indicating an error correction mode, and entering in a normal mode when receiving the end signal after a second predetermined time;
    a pattern generating circuit for receiving said start signal and said mode selection signal indicating said parity generation mode, and said start signal and said mode selection signal indicating said error correction mode to generate commands and addresses with respect to said memory circuit with the predetermined pattern in accordance with a mode, and outputting said end signal when the parity generating operation is finished in each mode;
    an error correcting circuit for receiving said start signal and said mode selection signal indicating said parity generation mode to generate a parity based on data read from said memory circuit, receiving said start signal and said mode selection signal indicating said error correction mode to perform an error correcting operation based on a parity generated with respect to data read from said memory circuit in said parity generation mode, and outputting data after error correcting; and
    an interface circuit for inputting said start signal and said mode selection signal indicating said parity generation mode, and said start signal and said mode selection signal indicating said error correction mode by said system block to said pattern generating circuit and said error correction circuit, supplying the commands and addresses by said pattern generating circuit to said memory circuit, inputting data read from said memory circuit to said error correcting circuit, and outputting data after an error correction mode processing by said error correction circuit to said memory circuit.

2. The semiconductor device as set forth in claim 1, wherein said memory circuit, said system block, said pattern generating circuit, said error correcting circuit and said interface circuit are integrated in a single chip.

3. The semiconductor device as set forth in claim 2, wherein said pattern generating circuit comprises a built-in self test (BIST) circuit.

4. The semiconductor device as set forth in claim 3, wherein said pattern generating circuit comprises a program retention memory inside, and receives said start signal to generate a pattern provided according to a program of said program retention memory.

5. The semiconductor device as set forth in claim 4, wherein said program retention memory is changeable with retaining content.

6. The semiconductor device as set forth in claim 2, wherein said memory circuit allocates a real data area and a parity area to different areas in a recording area.

7. The semiconductor device as set forth in claim 6, wherein said memory circuit is divided into a plurality of blocks and said parity data are stored in a block different from an area where a corresponding real data is recoded.

8. The semiconductor device as set forth in claim 7, wherein said memory circuit makes two blocks as one set and stores real data at the real data area of one block and corresponding parity data at the parity area of another block.

9. The semiconductor device as set forth in claim 2, wherein, in said error correction mode, said interface circuit supplies data to said memory circuit to write back only when there is a correcting bit.

10. The semiconductor device as set forth in claim 8, wherein, in said error correction mode, said interface circuit supplies data to said memory circuit to write back only when there is a correcting bit.

11. The semiconductor device as set forth in claim 10, wherein a command generated by said pattern generating circuit and supplied to said memory circuit passing though said interface circuit is common in each of the sets, and
even if one set has a correcting bit and another set does not have a correcting bit, said interface circuit, writes back data with respect to all sets.

12. The semiconductor device as set forth in claim 3, wherein the predetermined pattern of said pattern generating circuit comprises addresses corresponding to every memory address in the dynamic memory cell.

13. The semiconductor device as set forth in claim 2, wherein:
said memory circuit is divided into a plurality of memory banks, each having a data area and a parity area;
said memory banks are organized into memory sets, each comprising first and second memory banks; and
for each memory set, the parity area of the first memory bank stores parity information corresponding to the data stored in the data area of the second memory bank, and the parity area of the second memory bank stores parity information corresponding to the data stored in the data area of the first memory bank.

14. The semiconductor device as set forth in claim 13, wherein, in said error correction mode, said interface circuit supplies data to said memory circuit to write back only when there is a correcting bit.

15. The semiconductor device as set forth in claim 14, wherein a command generated by said pattern generating circuit and supplied to said memory circuit passing though said interface circuit is common in each of the memory sets, and
even if one memory set has a correcting bit and another memory set does not have a correcting bit, said interface circuit, writes back data with respect to all memory sets.

* * * * *